(12) United States Patent
Katayama et al.

(10) Patent No.: US 9,309,948 B2
(45) Date of Patent: Apr. 12, 2016

(54) SHOCK ABSORBER

(71) Applicant: HITACHI AUTOMOTIVE SYSTEMS, LTD., Ibaraki (JP)

(72) Inventors: Yohei Katayama, Yokohama (JP);
Hiroki Ohara, Yokohama (JP);
Sadatomo Matsumura, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/221,600

(22) Filed: Mar. 21, 2014

(65) Prior Publication Data
US 2014/0291088 A1 Oct. 2, 2014

(30) Foreign Application Priority Data

Mar. 29, 2013 (JP) ................. 2013-073889

(51) Int. Cl.
*F16F 9/34* (2006.01)
*F16F 9/348* (2006.01)
*F16F 9/32* (2006.01)

(52) U.S. Cl.
CPC .............. *F16F 9/3485* (2013.01); *F16F 9/341* (2013.01); *F16F 9/3257* (2013.01)

(58) Field of Classification Search
USPC .................. 188/266.2, 266.5, 266.6, 322.13, 188/322.15, 322.2; 267/158–161, 164, 165
See application file for complete search history.

(56) References Cited

U.S. PATENT DOCUMENTS

| 3,344,397 | A | * | 9/1967 | Elliott et al. ................. 367/189 |
| 3,589,703 | A | * | 6/1971 | Brookman ..................... 267/162 |
| 4,400,861 | A | * | 8/1983 | Parker .......................... 148/518 |
| 5,077,872 | A | * | 1/1992 | Guthammar .................. 24/704.1 |
| 5,269,499 | A | * | 12/1993 | Schwab ........................ 267/159 |
| 5,709,516 | A | * | 1/1998 | Peterson et al. ............... 411/544 |
| 5,915,677 | A | * | 6/1999 | Yajima et al. ................. 267/161 |
| 8,393,445 | B2 | * | 3/2013 | Sonsterod .................. 188/266.1 |
| 2011/0073424 | A1 | * | 3/2011 | Murakami ............... 188/322.13 |
| 2011/0203888 | A1 | * | 8/2011 | Sonsterod et al. ........ 188/322.13 |
| 2012/0247889 | A1 | * | 10/2012 | Yabe et al. .................... 188/269 |
| 2012/0305348 | A1 | * | 12/2012 | Katayama et al. .......... 188/266.2 |
| 2012/0305349 | A1 | * | 12/2012 | Murakami et al. ......... 188/266.6 |
| 2014/0231200 | A1 | * | 8/2014 | Katayama ..................... 188/314 |

FOREIGN PATENT DOCUMENTS

WO 2011/099143 8/2011

* cited by examiner

*Primary Examiner* — Christopher Schwartz
(74) *Attorney, Agent, or Firm* — Wenderoth, Lind & Ponack, L.L.P.

(57) ABSTRACT

A shock absorber including a damping force generation mechanism (30a) includes a spring member (106a) having radially extending spring portions (117) having high spring constants and circumferentially extending spring portions (118) having low spring constants. The radially extending spring portions and the circumferentially extending spring portions are integrally configured so that biasing forces thereof act dynamically linearly. An annular stepped portion limits strokes of the circumferentially extending spring portions and is provided on a cylindrical wall portion of a pilot body. As a result, within a range of damping force control, only the radially extending spring portions of the spring member are elastically deformed, whereby the durability of the spring member is enhanced, and only biasing forces of the radially extending spring portions of the spring member act on a pilot valve member, and thereby variation in a damping force is reduced so that the performance is improved.

10 Claims, 9 Drawing Sheets

SHOCK ABSORBER

BACKGROUND OF THE INVENTION

The present invention relates to a shock absorber that generates a damping force by controlling a flow of hydraulic fluid during a stroke of a piston rod.

Generally, a shock absorber mounted on a suspension apparatus or the like of a vehicle includes a piston with a piston rod coupled thereto, which is slidably and fittedly inserted in a cylinder sealingly containing hydraulic fluid, and generates a damping force by controlling a flow of the fluid generated by a sliding movement of the piston in the cylinder during a stroke of the piston rod with use of a damping force generation mechanism constituted by a orifice, a disk valve, and the like.

For example, a damping force adjustable shock absorber discussed in International Publication No. 2011/099143 includes a pilot chamber behind a main valve that is a damping force generation mechanism, and a spring element for biasing a pilot valve in a direction for opening a discharge passage from the pilot chamber, and adjusts a damping force by actuating an actuator so as to move the pilot valve in a direction for closing the discharge passage against the biasing force of the spring element to thereby introduce a part of a flow of hydraulic fluid into the pilot chamber to adjust an inner pressure of the pilot chamber.

Further, the spring element is constituted by two members, i.e., a coil spring having a low spring constant and configured to act on the pilot valve during a whole stroke, and a disk spring having a high spring constant and configured to act on the pilot valve only near a seat portion that closes the discharge passage, thereby acquiring a non-linear load-displacement characteristic. In other words, the coil spring allows the spring element to function as a spring for returning the pilot valve to a failure position, and the coil spring and the disk spring allow the spring element to function as a spring for controlling a stroke amount of the pilot valve.

SUMMARY OF THE INVENTION

According to the damping force generation mechanism discussed in the above-described International Publication No. 2011/099143, the spring element is constituted by the two members, i.e., the coil spring configured to act on the pilot valve during a whole stroke and the disk spring configured to act on the pilot valve only near the seat portion that closes the discharge passage. Therefore, when the disk spring does not act on the pilot valve while the pilot valve is separated from the seat portion, one action portion of the disk spring (one end side of the spring) is in an uninhibited state, whereby a vibration occurs at the disk spring due to a flow of the fluid. This vibration may become a generation source of a noise or may lead to a problem with the durability and the like of the spring even if a noise poses no problem, and therefore is undesirable.

An object of the present invention is to provide a shock absorber capable of preventing a vibration of a spring.

To achieve the above-described object, according to one aspect of the present invention, a shock absorber includes a cylinder sealingly containing hydraulic fluid, a piston slidably and fittedly inserted in the cylinder, a piston rod coupled to the piston and extending out of the cylinder, and a damping force generation mechanism configured to generate a damping force by controlling a flow of the hydraulic fluid generated by a sliding movement of the piston. The damping force generation mechanism includes a main valve configured to generate the damping force, a back pressure chamber configured to apply a back pressure in a direction for closing the main valve, an introduction passage configured to guide the back pressure into the back pressure chamber, a discharge passage configured to discharge the back pressure in the back pressure chamber, and a control valve disposed in the discharge passage. The control valve includes a valve body disposed in the discharge passage, a valve seat, an actuator configured to generate a force for moving the valve body according to a current, and a spring unit configured to bias the valve body in a direction opposite from a direction in which the valve body is moved by the actuator. The spring unit includes a spring member configured to act on the valve body throughout a whole range of the movement of the valve body, and a limiting member configured to limit a deflection of a part of the spring member against a predetermined or more deflection of the spring member.

The shock absorber according to the present invention can improve durability and the like.

DETAILED DESCRIPTION OF THE INVENTION

Figure 1:
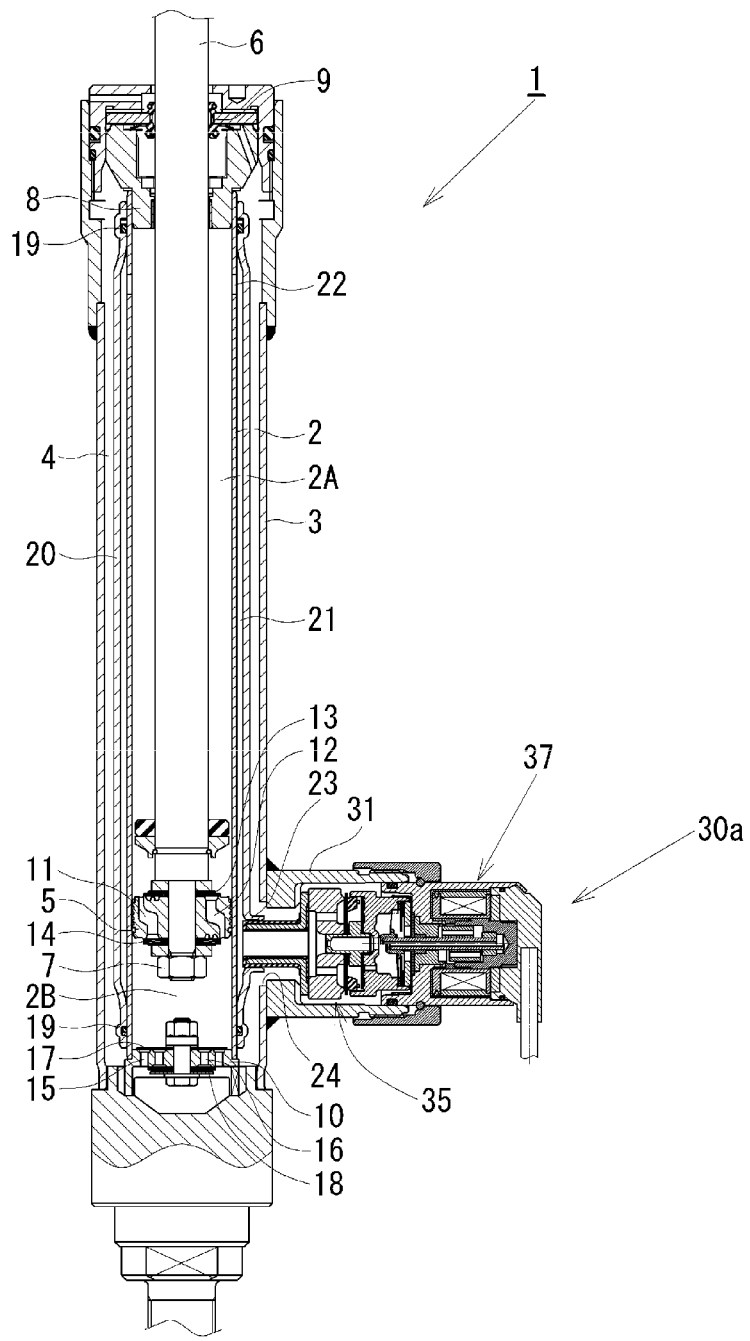
FIG. 1 is a cross-sectional view of a shock absorber according to an embodiment of the present invention.

In the following description, an embodiment of the present invention will be described in detail with reference to the accompanying drawings. As illustrated in FIG. 1, a damping force adjustable shock absorber 1, which corresponds to a shock absorber according to the present embodiment, has a double tube structure including an outer tube 3 outside a cylinder 2. A reservoir 4 is defined between the cylinder 2 and the outer tube 3. A piston 5 is slidably and fittedly inserted in the cylinder 2, and the interior of the cylinder 2 is divided into two chambers, a cylinder upper chamber 2A and a cylinder lower chamber 2b by this piston 5. One end of the piston rod 6 is coupled to the piston 5 by a nut 7. An opposite end side of the piston rod 6 penetrates through the cylinder upper chamber 2A, is inserted through a rod guide 8 and an oil seal 9 attached to upper ends of the cylinder 2 and the outer tube 3, and extends out of the cylinder 2. A base valve 10, which separates the cylinder lower chamber 2B and the reservoir 4, is disposed at a lower end of the cylinder 2.

Passages 11 and 12, which establish communication between the cylinder upper chamber 2A and the cylinder lower chamber 2B, are formed at the piston 5. A check valve 13 is disposed at the passage 12. The check valve 13 allows only a flow of hydraulic fluid from the cylinder lower chamber 2B to the cylinder upper chamber 2A. On the other hand, a disk valve 14 is disposed at the passage 11. The disk valve 14 opens when the pressure of the hydraulic fluid in the cylinder upper chamber 2A reaches a predetermined pressure, and releases this pressure toward the cylinder lower chamber 2B.

Passages 15 and 16, which establish communication between the cylinder lower chamber 2B and the reservoir 4, are formed at the base valve 10. A check valve 17 is disposed at the passage 15. The check valve 17 allows only a flow of the hydraulic fluid from the reservoir 4 to the cylinder lower chamber 2B. On the other hand, a disk valve 18 is disposed at the passage 16. The disk valve 18 opens when the pressure of the hydraulic fluid in the cylinder lower chamber 2B reaches a predetermined pressure, and releases this pressure toward the reservoir 4. Oil is sealingly contained in the cylinder 2 as the hydraulic fluid, and oil and gas are sealingly contained in the reservoir 4.

A separator tube 20 is externally fitted around the cylinder 2 via seal members 19 and 19 disposed at both the upper and lower ends, and an annular passage 21 is defined between the cylinder 2 and the separator tube 20. The annular passage 21 is in communication with the cylinder upper chamber 2A via a passage 22 formed at a sidewall of the cylinder 2 near the upper end. A cylindrical connection port 23 is formed at a lower portion of the separator tube 20 so as to open while protruding to the side. Further, an opening 24 is formed at a sidewall of the outer tube 3. The opening 24 is concentric with the connection port 23 and has a larger diameter than the connection port 23. A cylindrical case 31 is coupled so as to surround the opening 24 by welding or the like. A damping force generation mechanism 30a according to the first embodiment is attached in the case 31.

Figure 2:
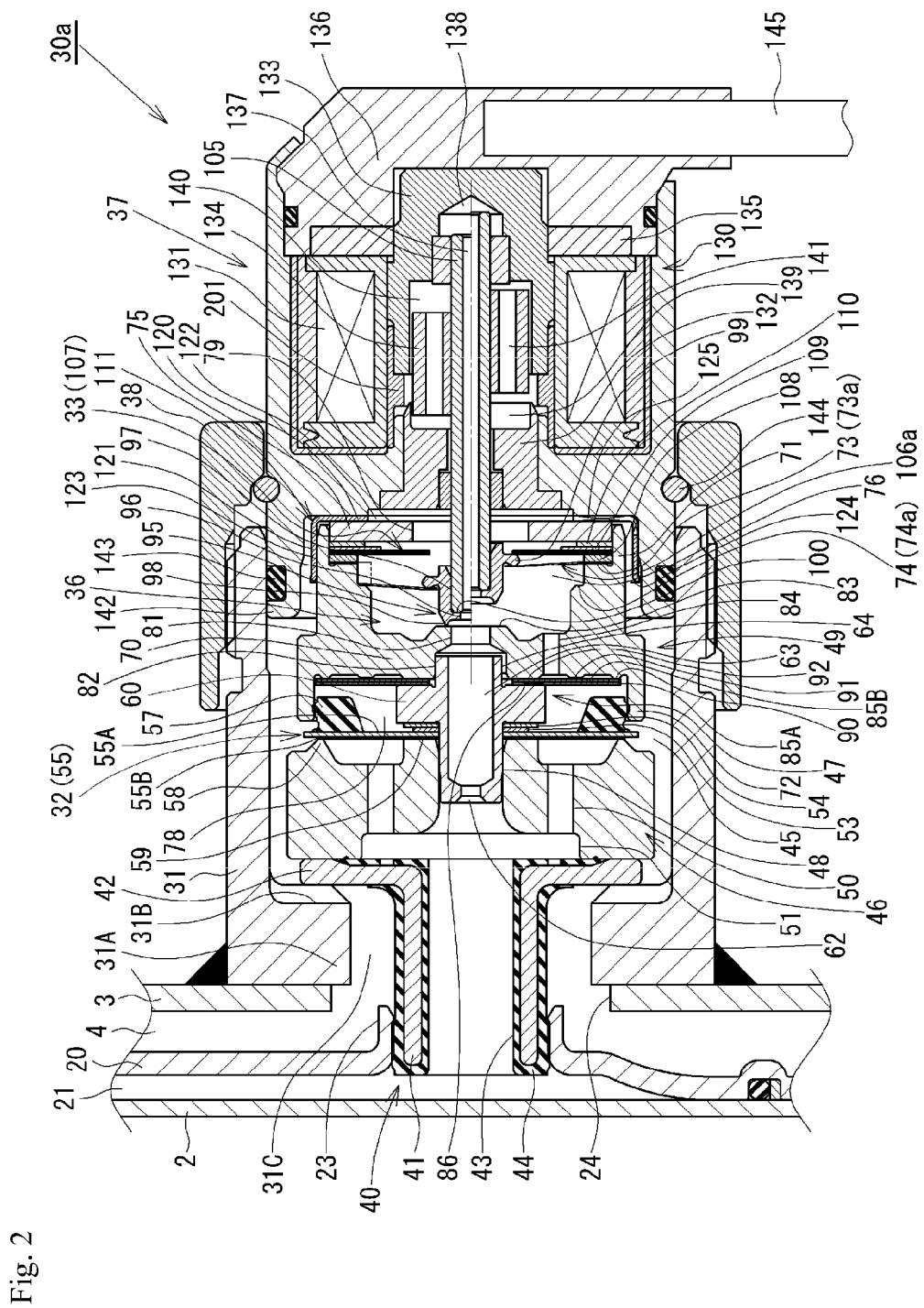
FIG. 2 is an enlarged cross-sectional view illustrating a damping force generation mechanism according to a first embodiment.

Next, the damping force generation mechanism 30a according to the first embodiment will be described with reference to FIGS. 2 to 5. Hereinafter, for convenience of description, the damping force generation mechanism 30a according to the first embodiment illustrated in FIG. 2 will be described, referring to an end near the cylinder 2 (the left side in FIG. 2) as one end side, and an end near a solenoid block 37 as an opposite end side. As illustrated in FIG. 2, the damping force generation mechanism 30a according to the first embodiment includes a valve block 35 having a pilot type (back pressure type) main valve 32 and a fail-safe valve 33 configured to function when a failure occurs, and a solenoid block 37 configured to actuate a pilot valve 36 that is a pressure control valve configured to be driven by a solenoid to control a valve opening pressure of the main valve 32. A passage member 40 is disposed at one end side of the valve block 35. The passage member 40 includes a cylindrical portion 41 having a communication passage 43, and a flange portion 42 radially extending from an outer circumference of an opposite end of the cylinder portion 41. An inner circumferential surface and an outer circumferential surface of the cylindrical portion 41 of the passage member 40, and one end surface and an opposite end surface of the flange portion 42 on an inner circumferential side are covered by a seal member 44. Then, fixation is realized by inserting the passage member 40 in the cylindrical case 31, coupling the valve block 35 and the solenoid block 37 to integrate them and then inserting them in the case 31, and threadably attaching the nut 38 to the case 31.

An inner flange 31A, which inwardly protrudes, is formed at one end of the case 31. A one end opening 31C is formed inside the inner flange 31A. A plurality of cutouts 31B is formed on an opposite end surface of the inner flange 31A for establishing communication between the interior of the reservoir 4 and a fluid chamber 45 in the case 31. An interior of a main body 46 of the valve block 35, which will be described below, and the connection port 23 of the separator tube 20 are in communication with each other via the passage member 40. Then, the flange portion 42 of the passage member 40 is in close contact with the main body 46, and is in abutment with the inner flange 31A of the case 31. Further, the cylindrical portion 41 penetrates through the one end opening 31C of the case 31, and a tip portion of the cylindrical portion 41 is inserted in the connection port 23. As a result, the connection port 23 and the interior of the main body 46 are in communication with each other via the passage member 40, and a portion where the connection portion 23 and the main body 46 are joined to each other is sealed by the seal member 44.

The valve block 35 includes the main valve 32, the main body 46 as a member on which the main valve 32 is seated, the fail-safe valve 33, a pilot pin 47, the pilot valve 36, and a pilot body 49 as a member on which the pilot valve 36 is seated. The main body 46 is formed into an annular shape having a support hole 48 for supporting the pilot pin, which axially penetrates at a radially central portion. A plurality of axially penetrating passages 50 is formed at the main body 46 along a circumferential direction. A circular recess 51 is formed at one end of the main body 46. The flange portion 42 of the passage member 40 is in abutment with a surface of the main body 46 around the circular recess 51 on an end surface side. The respective passages 50 are formed on a radially outer side of the circular recess 51. The respective passages 50 of the main body 46 are in communication with the communication passage 43 of the passage member 40 via the circular recess 51.

A main disk valve 55 as the main valve 32 is disposed at an opposite end of the main body 46. The main disk valve 55 is formed by stacking a slidable seal member-equipped disk 55A and a slit disk 55B. The slidable seal member-equipped disk 55A is disposed at an opposite end side of the main disk valve 55, and a slidable seal member 57 is fixedly attached to an outer circumferential portion of the disk 55A on a back surface side. The slit disk 55B is disposed at one end side of the main disk valve 55, and a plurality of slits that serves as orifices for setting a damping force in a piston low speed region is formed on an edge of an outer circumference of the disk 55B so as to be spaced apart from one another circumferentially. The slidable seal member 57 is fixedly attached to the outer circumferential portion of the slidable seal member-equipped disk 55A on the back surface side by, for example, a baking method. Further, an annular seat portion 58 and an annular clamping portion 59 are formed at the opposite end of the main body 46. The seat portion 58 protrudes toward the opposite end side (toward the main valve 32) on the outer circumferential side of the respective passages 50. The clamping portion 59 protrudes toward the opposite end side (toward the main valve 32) on the inner circumferential side of the respective passages 50. An outer circumferential portion of the slit disk 55B of the main disk valve 55 is seated on the seat portion 58 of the main body 46, and an inner circumferential portion of the slit disk 55B is in abutment with the clamping portion 59. On the other hand, a disk-like retainer 53 and a washer 54 are disposed so as to abut against an inner circumferential portion of the slidable seal member-equipped disk 55A of the main disk valve 55 in this order.

The pilot pin 47 is formed cylindrically. An annular protruding portion 60 is provided so as to radially outwardly protrude from an outer circumferential surface of the pilot pin 47 at an axially intermediate position. One end of the pilot pin 47 is clamped by the support hole 48 of the main body 46, by which the main disk valve 55, the retainer 53, and the washer 54 are clamped between the annular protruding portion 60 of the pilot pin 47 and the clamping portion 59 of the main body 46. Further, an axially extending orifice passage 62, and an axially extending large-diameter flow passage 63 are formed at the pilot pin 47. The orifice passage 62 has an opening at one end of the pilot pin 47. The flow passage 63 is in communication with the orifice passage 62 and has an opening at an opposite end of the pilot pin 47. A plurality of axially extending cutouts 64 are formed on an outer circumferential surface of the pilot pin 47 at the opposite end thereof so as to be spaced apart from one another circumferentially. For example, the opposite end of the pilot pin 47 is formed so as to have a substantially triangular cross-section by chamfering three surfaces of an outer circumference thereof, by which the cutouts 64 can be formed as shapes having chamfered portions.

The pilot body 49 is disposed at the opposite end side of the pilot pin 47. The pilot body 49 is formed so as to have a substantially H-shaped cross-section having a substantially circular bottom portion 70, an opposite end side cylindrical wall portion 71 extending from an outer circumferential edge of the bottom portion 70 to the opposite end side, and a one end side cylindrical wall portion 72 extending from the outer circumferential edge of the bottom portion 70 to the one end side. The opposite end side cylindrical wall portion 71 of the pilot body 49 has an inner diameter increasing toward an opening side in a stepwise manner, and includes two annular stepped portions 73 and 74 on an inner circumferential surface thereof. Step surfaces 73a and 74a of the respective annular stepped portions 73 and 74 extend in a direction perpendicular to an axial direction, i.e., extend in a radial direction of the pilot body 49. The step surface 74a of the annular stepped portion 74 serves as an abutment portion, and forms a limiting member. An opposite end opening of the pilot body 49 is closed by a holding plate 75. As a result, a valve chamber 76 is defined between the opposite end side cylindrical wall portion 71 of the pilot body 49 and the holding plate 75. A through-hole 79 is formed at a radially central portion of the holding plate 75. On the other hand, an inner circumferential surface of the one end side cylindrical wall portion 72 of the pilot body 49 is configured in such a manner that an outer circumferential portion of the slidable seal member 57 of the slidable seal member-equipped disk 55A of the main disk valve 55 slidably and liquid-tightly makes close contact therewith. As a result, a back pressure chamber 78 is defined in a range surrounded by the slidable seal member 57 and the one end side cylindrical wall portion 72 of the pilot body 49. A large-diameter support hole 82 and a small-diameter communication hole 81 are formed at a radially central portion of the bottom portion 70 of the pilot body 49. The large-diameter support hole 82 supports the opposite end of the pilot pin 47. The small-diameter communication hole 81 is in communication with the large-diameter support hole 82, and is opened at an opposite end side of the pilot body 49. A portion around the small-diameter communication hole 81 on a surface of the bottom portion 70 at the opposite end side is formed as an annular seat portion 83 that serves as a valve seat on which a pilot valve member 95 is seated. The pilot valve member 95 is a valve body that is a constituent element of the pilot valve 36, which will be described below. Further, a plurality of axially penetrating passages 84 is formed around the large-diameter support hole 82 and the small-diameter communication hole 81 at the bottom portion 70 of the pilot body 49 along a circumferential direction. The respective passages 84 are in communication with the valve chamber 76. The respective passages 84 are opened between a second seat portion 91 and a clamping portion 92 provided at one end side of the bottom portion 70 of the pilot body 49. A slit disk 85A, and a flexible disk 85B for adjusting deflection rigidity are disposed by being stacked from the one end side in this order, between the one end side of the bottom portion 70 of the pilot body 49 and the annular protruding portion 60 of the pilot pin 47. An inner circumferential portion of the slit disk 85A is in abutment with a surface of the annular protruding portion 60 on an opposite end side thereof. A plurality of radially extending elongated slits 86 is formed at an inner circumferential edge of the slit disk 85A. Then, the small-diameter communication hole 81 of the pilot body 49 and the back pressure chamber 78 are in communication with each other via the respective cutouts 64 formed at the pilot pin 47 and the slits 86 of the slit disk 85A. The orifice passage 62, the large-diameter communication passage 63, and the cutouts 64 of the pilot pin 47, and the slits 86 of the slit disk 85A correspond to an introduction passage that guides a back pressure into the back pressure chamber 78.

An annular first seat portion 90, the second seat portion 91, and the annular clamping portion 92 are formed on the surface of the bottom portion 70 of the pilot body 49 on the one end side. The first seat portion 90 protrudes at an outer circumferential end of this surface toward the one end side. The second seat portion 91 is disposed on an inner side of the first seat portion 90 so as to be spaced apart from the first seat portion 90, and protrudes toward the one end side. The clamping portion 92 protrudes on an inner circumferential side of the respective passages 84 toward the one end side. An outer circumferential end and a radially intermediate portion of the flexible disk 85B are seated on the first and second seat portions 90 and 91 of the pilot body 49, respectively, and an inner circumferential portion of the flexible disk 85B is in abutment with the clamping portion 92 of the pilot body 49. The opposite end of the pilot pin 47 is clamped by the large-diameter support hole 82 of the pilot body 49, by which the slit disk 85A and the flexible disk 85B are clamped between the annular protruding portion 60 of the pilot pin 47 and the clamping portion 92 of the pilot body 49. As a result, a deflection of the flexible disk 85B due to the inner pressure of the back pressure chamber 78 provides volume elasticity to the back pressure chamber 78. In other words, the flexible disk 85B is deflected to increase the volume of the back pressure chamber 78 to prevent the main disk valve 55 from being unstably opened by an excessive increase in the inner pressure of the back pressure chamber 78 due to a valve opening operation of the main disk valve 55. Further, the passages 84 are provided to guide air in the back pressure chamber 78 into the valve chamber 76 via the passages 84. Only a single passage may be provided as the passage 84, or the passage 84 may be omitted, if some measure is taken to prevent air from entering the back pressure chamber 78 during assembling or a vale opening operation of the main valve 55 unlikely becomes unstable.

The damping force generation mechanism 30a includes the pilot valve 36 that is separated from and seated on the seat portion 83 of the pilot body 49. The pilot valve 36 includes the pilot valve member 95, which is the valve body, and a spring member 106a, which is a spring unit for biasing the pilot valve member 95 in a direction for separating the pilot valve member 95 from the seat portion 83 (a direction opposite from a direction in which the pilot valve member 95 is moved by power supply to a solenoid actuator constituted by a coil 131, an actuation rod 105, and the like). The pilot valve member 95 is separated from and seated on the annular seat portion 83 formed on the pilot body 49, thereby opening and closing the small-diameter communication hole 81 of the pilot body 49. The pilot valve member 95 is formed into a substantially cylindrical shape, and has a through-hole 96 formed at one end side thereof, and a container hole 97. The container hole 97 is in communication with the through-hole 96, and axially extends so as to contain one end of the actuation rod . 105. An edge of an opposite end opening of the container hole 97 flares in a tapering manner. A rod receiving portion 100, which supports the actuation rod 105, is formed between the through-hole 96 and the container hole 97 within the pilot valve member 95. A valve tip portion 98 is formed on a surface of the pilot valve member 95 at one end thereof. The valve tip portion 98 annularly extends while having a substantially triangular cross-section, and is separated from and seated on the seat portion 83 of the pilot body 49. Further, a flange-like spring receiving portion 99, which radially extends, is formed on an outer circumferential portion of the pilot valve member 95 closer to an opposite end side thereof. It is desirable that the spring receiving portion 99 has a diameter reduced as much as possible to reduce fluid resistance in the valve chamber 76 while securing a diameter large enough to allow the spring receiving portion 99 to abut against failsafe disks 107 that will be described below, and the spring member 106a. The spring receiving portion 99 of the pilot valve member 95 is formed in such a manner that an outer diameter thereof is smaller than an inner diameter of the through-hole 79 of the holding plate 75.

Figure 3:
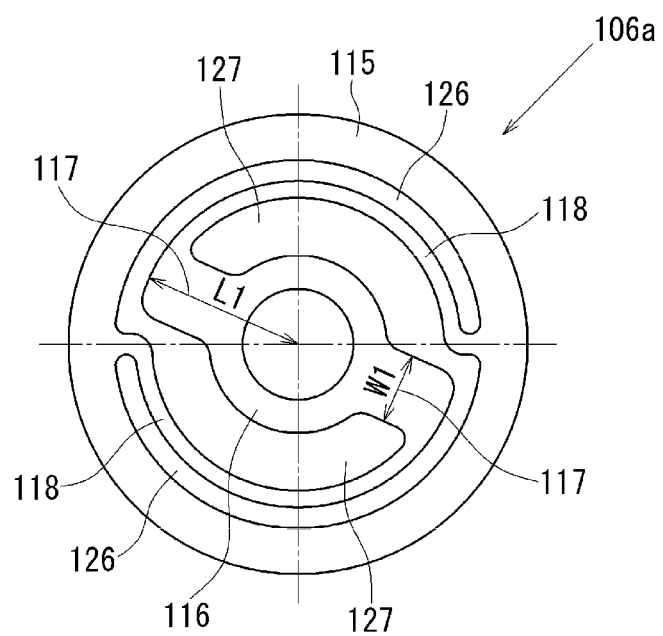
FIG. 3 is a plain view of a spring member employed in the damping force generation mechanism according to the first embodiment.

The pilot valve member 95 is elastically held so as to be axially movable while facing the seat portion 83 around the small-diameter connection hole 81 of the pilot body 49, by the spring member 106a. The spring member 106a, which is the spring unit, is constituted by a thin disk-like member. The spring member 106a has a spring function for returning the pilot valve 36 (the pilot valve member 95) to a failure position, and a spring function for controlling a lift amount of the pilot valve 36. As illustrated in FIG. 3, the spring member 106a includes an outer annular portion 115, an inner annular portion 116, a pair of radially extending spring portions 117, and circumferentially extending spring portions 118. The outer annular portion 115 annularly extends in a band-like manner on an outer side. The inner annular portion 116 is provided at a radially central portion, and annularly extends in a band-like manner. The radially extending spring portions 117 extend in a band-like manner from an outer circumference of the inner annular portion 116 in radially outward opposite directions, respectively. The circumferentially extending spring portions 118 circumferentially extend in a band-like manner from opposite portions on an inner circumferential surface of the outer annular portion 115, respectively, and are connected to tips of the pair of radially extending spring portions 117, respectively. An outer diameter of the outer annular portion 115 substantially match an inner diameter of the opposite end side cylindrical wall portion 71 on the opposite end side relative to the annular stepped portion 73 of the pilot body 49. An inner diameter of the inner annular portion 116 substantially matches an outer diameter of the pilot valve member 95. An outer diameter of the inner annular portion 116 is set so as to be larger than an outer diameter of the spring receiving portion 99 of the pilot valve member 95. The respective circumferentially extending spring portions 118 are provided so as to extend between the outer annular portion 115 and the pair of radially extending spring portions 117. Respective outer spaces 126 are defined between the respective circumferentially extending spring portions 118 and the outer annular portion 115. On the other hand, inner spaces 127 are defined between the respective circumferentially extending spring portions 118 and the inner annular portion 116. The inner spaces 127 serve as a flow passage of the oil. The respective outer spaces 126 are formed so as to have widths narrower than the respective inner spaces 127. Widths of the respective circumferentially extending spring portions 118 are narrower than a width of the outer annular portion 115, more specifically, are set to a half of the width of the outer annular portion 115 or narrower. Further, widths of the respective radially extending spring portions 117 are set so as to be wider than the widths of the respective circumferentially extending spring portions 118. Therefore, spring constants of the respective circumferentially extending spring portions 118 are set so as to be lower than spring constants of the respective radially extending spring portions 117. The respective radially extending spring portions 117 correspond to a first action spring portion, and the respective circumferentially extending spring portions 118 correspond to a second spring portion. Then, this arrangement allows the respective circumferentially extending spring portions 118 and the respective radially extending spring portions 117 of the spring member 106a to exert biasing forces that act dynamically linearly, so that the spring member 106a is configured as a spring that exerts a spring force acting throughout a whole range in which the valve body moves, and provides a non-linear load-displacement characteristic (refer to FIG. 5). In this manner, if the spring element 106a is made of a metallic spring steel having a constant thickness, the widths of the respective radially extending spring portions 117 and the respective circumferentially extending spring portions 118 are set so as to satisfy "the respective radially extending spring portions 117>the respective circumferentially extending spring portions 118", which allows a difference to be made between the spring constants. According to the present invention, even if the spring constant is invariable, the spring member 106a has a high spring constant as the whole spring after abutment against the annular stepped portion 74, whereby the spring member 106a may be configured in this manner. Further, the structure of the plate spring may be arbitrarily designed according to a characteristic, and the plate spring may have any structure. Further, the present embodiment may use a conical coil spring.

Further, a radius L1 to a tip of the radially extending spring portion 117 of the spring member 106a is set so as to be longer than a radius R1 (refer to FIG. 4(a)) of the opposite end side cylindrical wall portion 71 of the pilot body 49 on the one end side relative to the annular stepped portion 74, and shorter than a radius R2 (refer to FIG. 4(a)) of the opposite end side cylindrical wall portion 71 of the pilot body 49 on the opposite end side relative to the annular stepped portion 74. Then, in the spring member 106a, the respective circumferentially extending spring portions 118 and the respective radially extending spring portions 117 function as a spring for returning the pilot valve 36 to the failure position, and also function as a spring for controlling the lift amount of the pilot valve 36. However, the spring forces of the respective circumferentially extending spring portions 118 are constant and do not increase during the control of the lift amount of the pilot valve 36, whereby the lift amount of the pilot valve 36 near the valve seat is changed based on balance between an increase in a thrust force from the solenoid actuator and an increase in the spring forces of the respective radially extending spring portions 117.

Figure 4:
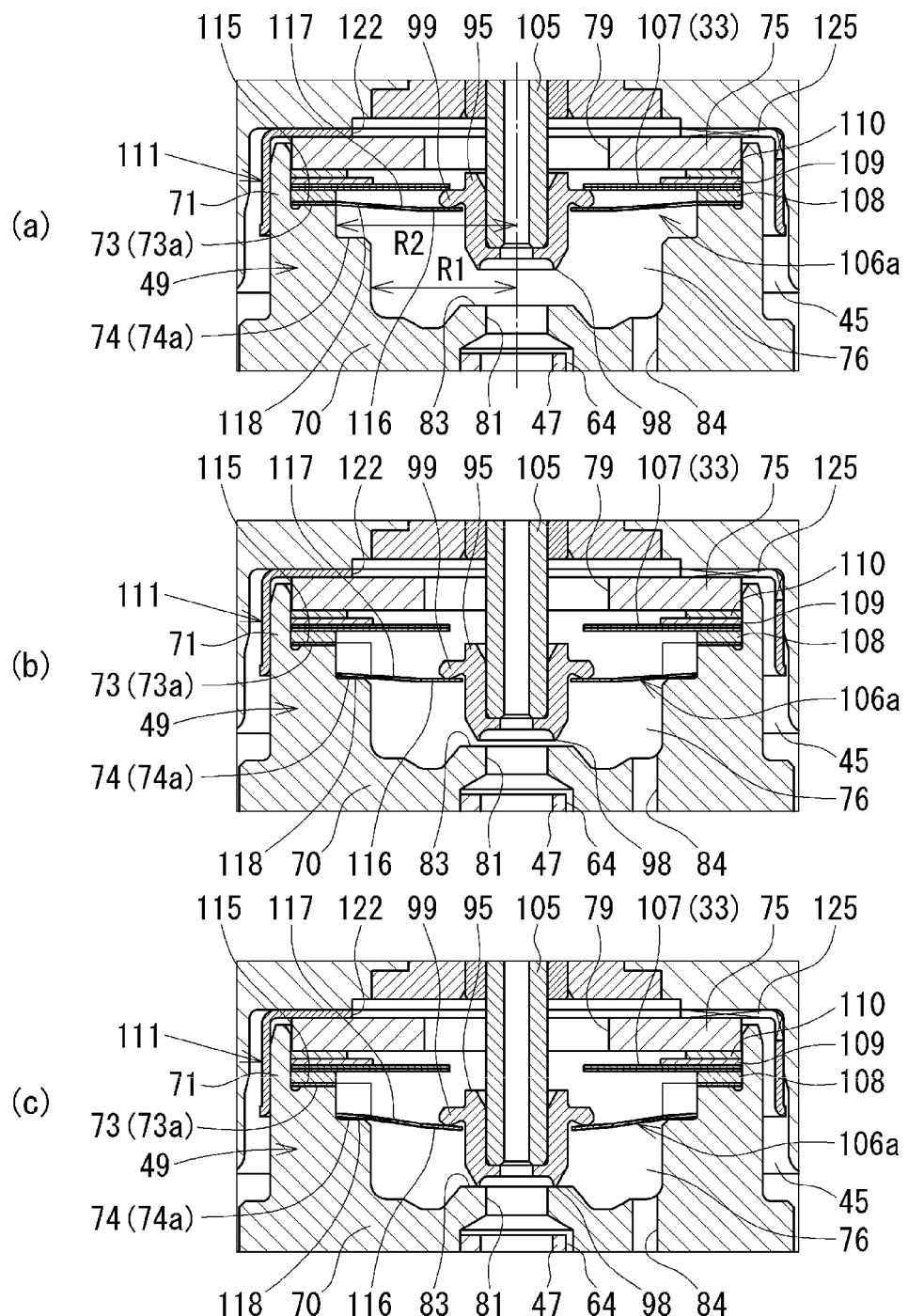
FIG. 4 are cross-sectional views illustrating an operation of the damping force generation mechanism according to the first embodiment when power is supplied to a coil.

Then, as illustrated in FIGS. 2 and 4, the outer annular portion 115 of the spring member 106a is supported and held by the step surface 73a of the annular stepped portion 73 of the opposite end side cylindrical wall portion 71 of the pilot body 49, while the one end side of the pilot valve member 95 is inserted in the inner annular portion 116 of the spring member 106a and the inner annular portion 116 is in abutment with a one end surface of the spring receiving portion 99. Further, a plurality of fail-safe disks 107, which is the fail-safe valve 33, is stacked on an opposite end side of the spring receiving portion 99. Then, a washer 108 and outer circumferential portions of the respective fail-safe disks 107 are respectively stacked on the outer annular portion 115 of the spring member 106a, and inner circumferential portions of the respective fail-safe disks 107 are in abutment with an opposite end surface of the spring receiving portion 99. Further, a retainer 109 and a spacer 110 are stacked on the outer circumferential portions of the respective fail-safe disks 107, and an opposite end opening of the opposite end side cylindrical wall portion 71 of the pilot body 49 is closed by the holding plate 75 and a cap 111 that will be described below. As a result, the respective circumferentially extending spring portions 118 and the respective radially extending spring portions 117 of the spring member 106a are axially elastically displaced, thereby providing biasing forces against a movement of the pilot valve member 95 toward the one end side in the axial direction. The control valve is constituted by the pilot valve member 95 as the valve body, the solenoid actuator as the actuator that generates a force for moving the pilot valve member 95 according to a current, the spring member 106a as the spring unit that acts on the pilot valve member 95 in the direction in which the pilot valve member 95 moves, and the like.

As illustrated in FIG. 2, the cap 111 is formed in to a bottomed cylindrical shape including a disk portion 120 that has an insertion hole 122 and fixes the holding plate 75, and a cylindrical body portion 121 extending from an outer circumferential edge of the disk portion 120 toward the one end side. The cylindrical body portion 121 includes a small-diameter body portion 123 and a large-diameter body portion 124 formed alternately along the circumferential direction. Cutouts 125 are formed at the disk portion 120 so as to radially extend from the insertion hole 122 to a circumferential edge of the large-diameter body portion 124. The cap 111 is configured in such a manner that an inner circumferential surface of the small-diameter body portion 123 is fitted to an outer circumferential surface of the opposite end side cylindrical wall portion 71 of the pilot body 49, and an outer circumferential surface of the large-diameter body portion 124 is fitted to an inner circumferential surface of a cylindrical portion 142 of a solenoid case 130 that will be described below. In this fitted state, the valve chamber 76 and the fluid chamber 45 in the case 31 are in communication with each other via the respective cutouts 125 of the cap 111. The slits 86 of the slit disk 85A, the cutouts 64 of the pilot pin 47, the small-diameter communication hole 81 of the pilot body 49, the valve chamber 76, the through-hole 79 of the holding plate 75, the insertion hole 122 of the cap 111, the cutouts 125 of the cap 111, the fluid chamber 45 in the case 32, and the inner flange 31A of the case 31 correspond to a discharge passage for discharging the back pressure in the back pressure chamber 78.

The solenoid block 37 is formed by fixing a ring member 201 and a core 133 by welding or the like, and press-fitting and fixing a core 132 in such a stat that a plunger 134 axially movably supported in the solenoid case 130, and the hollow actuation rod 105 coupled to the plunger 134 are mounted in the solenoid case 130. Further, they are fixed by a annular spacer 135 and a cup-like cover 136 attached to an opposite end of the solenoid case 130 by swaging. The coil 131, the cores 132 and 133, the plunger 134, and the actuation rod 105 constitute the solenoid actuator. Then, an axial thrust force is generated at the plunger 134 according to a current by power supply to the coil 131 via a lead wire 145. One end of the actuation rod 105 has an outer circumferential portion formed in a tapered manner so as to have a reducing diameter. The large-diameter flow passage 63 of the pilot pin 47 and a chamber 138 behind the actuation rod 105 are in communication with each other via a communication passage 137 formed in the hollow actuation rod 105. Further, the plunger 134 also has a communication passage 141 to establish communication between chambers 139 and 140 defined on both end sides. These communication passages 137 and 141 allow a balanced fluid force to act on the actuation rod 105 and the plunger 134, and an appropriate damping force to be applied to their movements.

The solenoid case 130 includes the cylindrical portion 142 fitted in the case 31 on one end side thereof. The large-diameter body portion 124 of the cap 111 attached to the pilot body 49 is fitted in the cylindrical portion 142. An O-ring 143 seals between the cylindrical portion 142 and the case 31. The solenoid case 130 is coupled to the valve block 35 in such a state that one end of the actuation rod 105 protruding inside the cylindrical portion 142 is in abutment with the rod receiving portion 100 while being inserted in the container hole 97 of the pilot valve member 95 mounted in the opposite end side cylindrical wall portion 71 of the pilot body 49, and the large-diameter body portion 124 of the cap 111 attached to the pilot body 49 is fitted in the cylindrical portion 142. Then, the solenoid case 130 is fixed to the case 31 by holding a retaining ring 144 attached in an outer circumferential groove of the solenoid case 130 by a nut 38.

Next, an operation of the damping force adjustable shock absorber 1 will be described. The damping force adjustable shock absorber 1 is mounted between a sprung side and an unsprung side of a suspension apparatus of a vehicle. The lead wire 145 is connected to a in-vehicle controller or the like. When the damping force generation mechanism 30a according to the first embodiment is in a normal operation state, as illustrated in FIG. 4, power is supplied to the coil 131, whereby the pilot valve member 95 (the valve body) of the pilot valve 36 is advanced toward the seat portion 83 (the valve seat) of the pilot body 49 by the actuation rod 105. At this time, the respective circumferentially extending spring portions 118 of the spring member 106a are elastically deformed, and connection portions between the respective circumferentially extending spring portions 118 and the respective radially extending spring portions 117 (the tip portions of the respective radially extending spring portions 117) abut against the annular stepped portion 74 of the opposite end side cylindrical wall portion 71 of the pilot body 49 (a deflection of the spring member at this time corresponds to a predetermined deflection of the present invention). After that, only the respective radially extending spring portions 117 of the spring member 106a are elastically deformed, and the pilot valve member 95 is advanced against the biasing forces of the respective radially extending spring portions 117 so that the valve tip portion 98 is seated on the seat portion 83 of the pilot body 49. As a result, pressure control by the pilot valve 36 is performed by controlling the valve opening pressure of the pilot valve 36 based on the current supplied to the coil 131. In this manner, the connection portions between the respective circumferentially extending spring portions 118 and the respective radially extending spring portions 117 correspond to the abutment portion in the present invention. This abutment portion can be arbitrarily adjusted according to a required characteristic, and may be shifted toward a radially inner side relative to the connection portions of the respective radially extending spring portions 117. Further, the abutment portion does not necessarily have to directly abut against the annular stepped portion 74. For example, a washer may be provided on the annular stepped portion 74, and the abutment portion may abut against the washer. In this case, the characteristic can be tuned by preparing washers having different inner diameters.

More specifically, during normal control, if a low current is supplied to the coil 131 so that a small thrust force is applied to the pilot valve member 95, the pilot valve member 95 operates from a state illustrated in FIG. 4(a) to a state illustrated in FIG. 4(b). In other words, the pilot valve member 95 is advanced to a position where the respective radially extending spring portions 117 and the respective circumferentially extending spring portions 118 of the spring member 106a are elastically deformed so that the connection portions between the respective circumferentially extending spring portions 118 and the respective radially extending spring portions 117 abut against the step surface 74a of the annular stepped portion 74 formed on the opposite end side cylindrical wall portion 71 of the pilot body 49. Then, the position of the pilot valve member 95 is determined (a point B on a spring displacement illustrated in FIG. 5) when a balanced state is established between the thrust force applied to the pilot valve member 95 and the biasing forces of the respective circumferentially extending spring portions 118 and the respective radially extending spring portions 117 of the spring member 106a. At this time, the respective circumferentially extending spring portions 118 and the respective radially extending spring portions 117 function as a dynamically linear spring. Therefore, if there is a large difference between the spring constants of the respective circumferentially extending spring portions 118 and the respective radially extending spring portions 117, the spring member 106a as a whole has a spring constant closer to the lower spring constant (a value smaller than the lower spring constant). Therefore, according to the present embodiment, the spring member 106a has a spring characteristic L illustrated in FIG. 5.

After that, further, gradually increasing the current supplied to the coil 131 leads to an increase in the thrust force applied to the pilot valve member 95, and the pilot valve member 95 is advanced according to this increase. More specifically, from the state illustrated in FIG. 4(b), the respective circumferentially extending spring portions 118 of the spring member 106a are prevented from being further deformed while the respective radially extending spring portions 117 start being elastically deformed to allow the pilot valve member 95 to be further advanced. Then, the position of the pilot valve member 95 is determined (a point C on the spring displacement illustrated in FIG. 5) when a balanced state is established between the thrust force applied to the pilot valve member 95 and the biasing forces of the respective circumferentially extending spring portions 118 and the respective radially extending spring portions 117 of the spring member 106a. At this time, the spring member 106a as a whole has a spring constant equal to the spring constants of the respective radially extending spring portions 117, and the spring force increases only by an amount corresponding to the deflection of the respective radially extending spring portions 117 (the spring forces of the respective circumferentially extending spring portions 118 are constant and unchanged).

After that, further, increasing the current supplied to the coil 131 leads to an increase in the thrust force applied to the pilot valve member 95, and the pilot valve member 95 is advanced according to this increase. More specifically, as illustrated in FIG. 4(c), the respective radially extending spring portions 117 of the spring member 106a are further largely elastically deformed, and the valve tip portion 98 of the pilot valve member 95 is seated on the seat portion 83 of the pilot body 49 against the biasing force of the spring member 106a, in particularly, the respective circumferentially extending spring portions 118 and the respective radially extending spring portions 117 (a point D on the spring displacement illustrated in FIG. 5). In other words, when a low current is supplied to the coil 131 to generate a soft-side damping force, the pilot valve member 95 is moved to such a position that the connection portions between the respective circumferentially extending spring portions 118 and the respective radially extending spring portions 117 of the spring member 106a abut against the annular stepped portion 74 of the opposite end side cylindrical wall portion 71 of the pilot body 49. On the other hand, when a large current is supplied to the coil 131 to generate a hard-side damping force, the pilot valve member 95 is moved to such a position that the respective radially extending spring portions 117 of the spring member 106a are maximally elastically deformed so that the valve tip portion 98 is seated on the seat portion 83 of the pilot body 49. In other words, the range of the movement of the pilot valve member 95 from the position where the connection portions between the respective circumferentially extending spring portions 118 and the respective radially extending spring portions 117 of the spring member 106a abut against the annular stepped portion 74 of the opposite end side cylindrical wall portion 71 of the pilot body 49 to the position where the respective radially extending spring portions 117 of the spring member 106a are maximally elastically deformed so that the valve tip portion 98 is seated on the seat portion 83 of the pilot body 49 according to how high or low current is supplied to the coil 131 is a range used in damping force control (a range from the point B to the point D on the spring displacement illustrated in FIG. 5). Therefore, in the range of damping force control, the biasing forces of the respective radially extending spring portions 117 and the respective circumferentially extending spring portions 118 of the spring member 106a act on the pilot valve member 95, and the spring element 106a has a spring constant equal to the spring constants of the respective radially extending spring portions 117, i.e., a high spring constant, thereby exerting a large biasing force. Accordingly, the pilot valve member 95 is moved by a small amount relative to a change in the current, thereby preventing a variation from occurring in the damping force.

Then, during an extension stroke of the piston rod 6, a movement of the piston 5 in the cylinder 2 causes the check valve 13 of the piston 5 to be closed, and the oil in the cylinder upper chamber 2A to be pressurized to be thereby transmitted through the passage 22 and the annular passage 21 to be introduced into the passage member 40 of the damping force generation mechanism 30a from the connection port 23 of the separator tube 20 before the disk valve 14 is opened.

At this time, the oil pushes and opens the check valve 17 of the base valve 10 and flows from the reservoir 4 into the cylinder lower chamber 2B by an amount corresponding to the movement of the piston 5. Once the pressure in the cylinder upper chamber 2A reaches the valve opening pressure of the disk valve 14 of the piston 5, the disk valve 14 is opened so that the pressure in the cylinder upper chamber 2A is released into the cylinder lower chamber 2B, thereby preventing an excessive increase in the pressure in the cylinder upper chamber 2A.

Then, in the damping force generation mechanism 30a according to the first embodiment, the oil introduced from the passage member 40 is transmitted through the orifice passage 62 and the large-diameter flow passage 63 of the pilot pin 47 and the small-diameter communication hole 81 of the pilot body 49, and is introduced into the valve chamber 76 by pushing and opening the pilot valve member 95 of the pilot valve 36, before the main disk valve 55 of the main valve 32 is opened (in the piston low speed region). Then, the oil in the valve chamber 76 is introduced into the reservoir 4 through the through-hole 79 of the holding plate 75, the cutouts 125 of the cap 111, the fluid chamber 45 in the case 31, and the cutouts 31B of the inner flange 31A. After that, when the piston speed increases and the pressure in the cylinder upper chamber 2A of the cylinder 2 reaches the valve opening pressure of the main disk valve 55, the oil introduced in the passage member 40 is directly introduced into the fluid chamber 45 in the case 31 by being transmitted through the circular recess 51 and the respective passages 50 of the main body 46, and pushing and opening the main disk valve 55.

On the other hand, during a compression stroke of the piston rod 6, a movement of the piston 5 in the cylinder 2 causes the check valve 13 of the piston 5 to be opened, the check valve 17 at the passage 15 of the base valve 10 to be closed, and the oil in the piston lower chamber 2B to be introduced into the cylinder upper chamber 2A before the disk valve 18 is opened. Then, the oil is introduced from the cylinder upper chamber 2A into the reservoir 4 by an amount corresponding to the entry of the piston rod 6 into the cylinder 2 while being transmitted through the same route as the route at the time of the above-described extension stroke. Once the pressure in the cylinder lower chamber 2B reaches the valve opening pressure of the disk valve 18 of the base valve 10, the disk valve 18 is opened to release the pressure in the cylinder lower chamber 2B into the reservoir 4, thereby preventing an excessive increase in the pressure in the cylinder lower chamber 2B.

In this manner, during both the extension stroke and compression stroke of the piston rod 6, in the damping force generation mechanism 30a according to the first embodiment, a damping force is generated due to the orifice passage 62 of the pilot pin 47 and the valve opening pressure of the pilot valve member 95 of the pilot valve 36 before the main disk valve 55 of the main valve 32 is opened (in the low piston speed region). Further, after the main disk valve 55 is opened (in a high piston speed region), a damping force is generated according to an opening degree of the main disk valve 55. Then, the valve opening pressure of the pilot vale 36 is adjusted based on the current supplied to the coil 131, whereby the damping force can be directly controlled regardless of the piston speed. In other words, the oil is released via the small-diameter communication hole 81 of the pilot body 49, the cutouts 64 of the pilot pin 47, and the slits 86 of the slit disk 85A by the valve opening pressure of the pilot valve 36, whereby the inner pressure of the back pressure chamber 78 is changed. Because the inner pressure of the back pressure chamber 78 acts on the main disk valve 55 in the valve closing direction, the valve opening pressure of the main disk valve 55 can be adjusted at the same time by controlling the valve opening pressure of the pilot valve 36, by which an adjustable range of the damping force characteristic can be extended.

Figure 5:
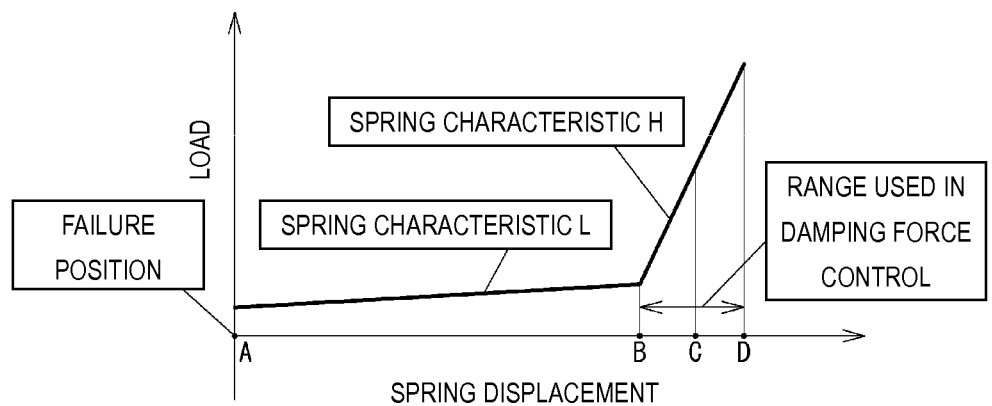
FIG. 5 illustrates a load-displacement characteristic of the spring member employed in the damping force generation mechanism according to the first embodiment

When the thrust force of the plunger 134 is lost due to occurrence of a failure such as disconnection of the coil 131 or a malfunction of the in-vehicle controller, the pilot valve member 95 is retracted by the biasing forces of the respective circumferentially extending spring portions 118 and the respective radially extending spring portions 117 of the spring member 106a, and the opposite end surface of the spring receiving portion 99 is set into abutment with the respective fail-safe disks 107 of the fail-safe valve 33 (the state illustrated in FIG. 4(a); the spring displacement is located at a point A illustrated in FIG. 5). Then, when the pilot valve member 95 is in this state, the oil in the valve chamber 76 pushes and opens the respective fail-safe disks 107, and is introduced into the fluid chamber 45 in the case 31 via the through-hole 79 of the holding plate 75 and the cutouts 125 of the cap 111. In this manner, the flow of the oil from the valve chamber 76 into the fluid chamber 45 in the case 31 is controlled by the respective fail-safe disks 107, whereby a desired damping force can be generated according to settings of valve opening pressures of the respective fail-safe disks 107, and the inner pressure of the back pressure chamber 78, i.e., the valve opening pressure of the main disk valve 55 can be adjusted. As a result, an appropriate damping force can be acquired even when a failure occurs.

In the above-described damping force generation mechanism 30a according to the first embodiment, the spring member 106a is constituted by the respective circumferentially extending spring portions 118 having low spring constants, and the respective radially extending spring portions 117 having higher spring constants than the respective circumferentially extending spring portions 118 as one spring. Therefore, tension is constantly applied to the whole spring, whereby a vibration of the spring itself can be reduced compared to the conventional technique in which they are configured as separate bodies. As a result, a noise due to the vibration of the spring can be also prevented from being generated, and further, the durability can be improved. Further, the assemblability can be enhanced so that the productivity can be improved compared to two springs. Further, in the range of damping force control, only the respective radially extending spring portions 117 of the spring member 106a are elastically deformed, and the respective circumferentially extending spring portions 118 are not elastically deformed after the pilot valve member 95 is advanced toward the seat portion 83 relative to the positions where the respective circumferentially extending spring portions 118 abut against the annular stepped portion 74 formed on the pilot body 49. Therefore, deformation amounts of the respective circumferentially extending spring portions 118 can be reduced to reduce the spring constants, whereby the durability of the respective circumferentially extending spring portions 118 can be enhanced. As a result, the spring constants can be reduced by further reducing the widths and thicknesses of the respective circumferentially extending spring portions 118, whereby the design flexibility can be increased. Further, in the spring member 106a, the inner spaces 127 as the flow passages of the oil are formed so as to have areas larger than the conventional technique. This arrangement reduces a resistance force against a movement of the pilot valve member 95 toward the seat portion 83 and therefore improves damping force responsiveness. Further, when the oil passes through the inner spaces 127, an inertia force of the oil acting on the spring member 106a is reduced so that the pilot valve member 95 can be prevented from being moved away from the seat portion 83. The respective circumferentially extending spring portions 118 are configured so as not to be elastically deformed after the pilot valve member 95 is advanced toward the seat portion 83 relative to the positions where the respective circumferentially extending spring portions 118 abut against the annular stepped portion formed on the pilot body 49. However, the shapes of the respective circumferentially extending spring portions 118 and the annular stepped portion 74 may be changed so as to allow the respective circumferentially extending spring portions 118 to be slightly elastically deformed. In other words, a stroke increase amount of the respective circumferentially extending spring portions 118 with the spring constants set low may be set to 0 by the annular stepped portion 74 as the limiting member, or the shape of the annular stepped portion 74 may be changed so as to reduce the increase amount.

Figure 6:
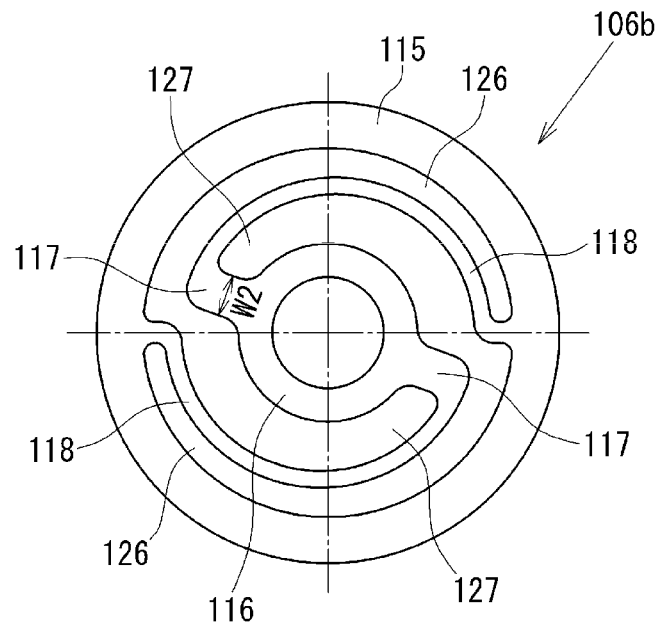
FIG. 6 is a plain view of a spring member employed in a damping force generation mechanism according to a second embodiment.
Figure 7:
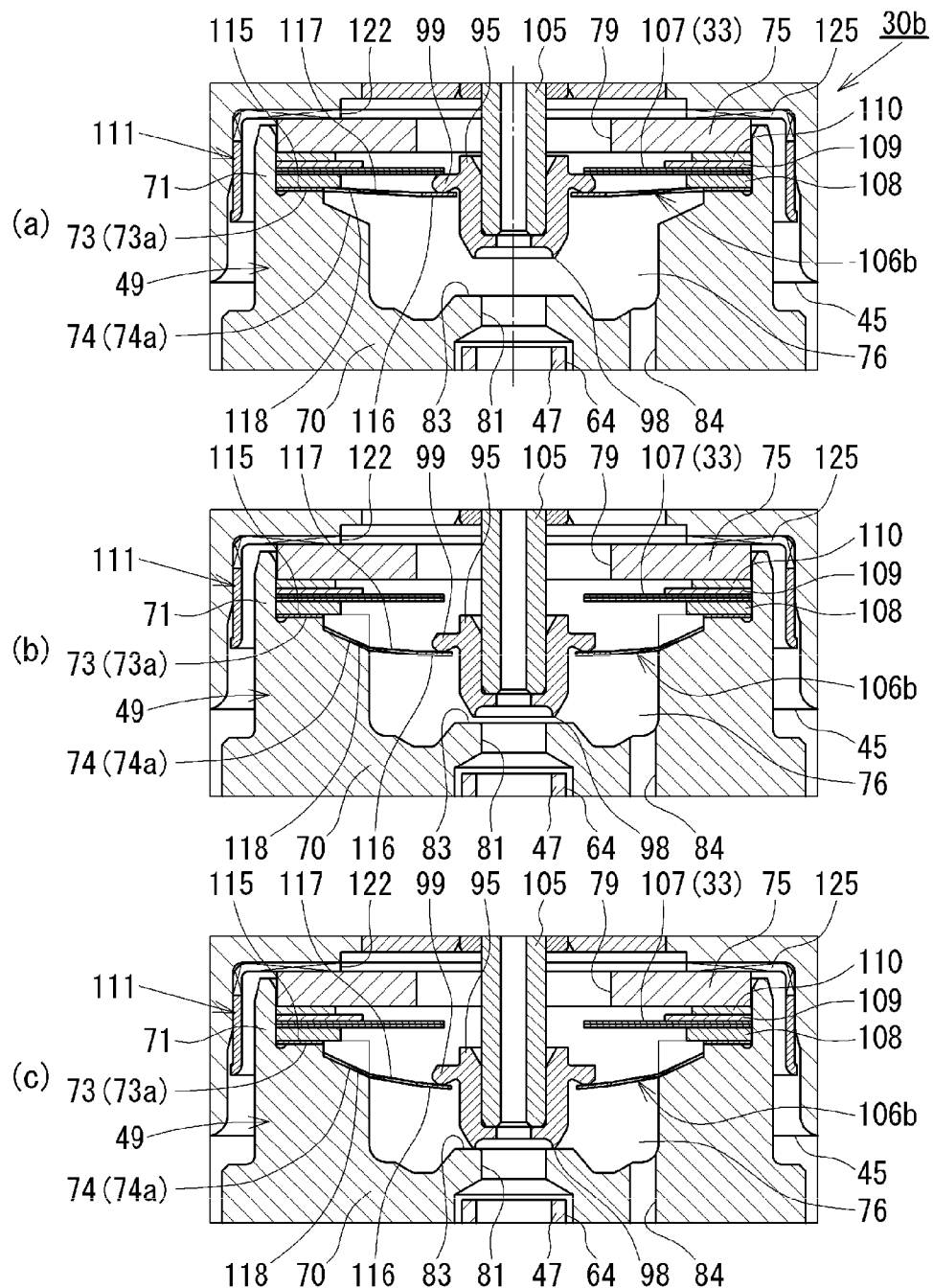
FIG. 7 are cross-sectional views illustrating an operation of the damping force generation mechanism according to the second embodiment when power is supplied to the coil.

Next, a damping force generation mechanism 30b according to a second embodiment will be described with reference to FIGS. 6 and 7. In the following description of the damping force generation mechanism 30b according to the second embodiment, only a difference from the damping force generation mechanism 30a according to the first embodiment will be described. In the damping force generation mechanism 30b according to the second embodiment, as illustrated in FIG. 7(a), the step surface 74a of the annular stepped portion 74 formed on the opposite end side cylindrical wall portion 71 of the pilot body 49 is constituted by an inclined surface tilting to the one end side on an inner side thereof In the present embodiment, an innermost circumference of the inclined surface corresponds to the abutment portion of the present invention. Further, as illustrated in FIG. 6, the respective radially extending spring portions 117 of the spring member 106 are formed in such a manner that widths W2 thereof are narrower than the widths W1 of the respective radially extending spring portions 117 of the spring member 106a employed in the damping force generation mechanism 30a according to the first embodiment. Therefore, when the pilot valve member 95 is advanced by current supply to the coil 131, as illustrated in FIG. 7(b), first, the respective circumferentially extending spring portions 118 of the spring member 106a are elastically deformed while abutting along the step surface 74a, which is the inclined surface of the annular stepped portion 74 of the opposite end side cylindrical wall portion 71. After that, upon an increase in the current supplied to the coil 131, as illustrated in FIG. 7(c), only the respective radially extending spring portions 117 of the spring member 106a are elastically deformed according to the advancement of the pilot valve member 95. Eventually, the valve tip portion 98 of the pilot valve member 95 is seated on the seat portion 83 of the pilot body 49.

Then, the damping force generation mechanism 30b according to the second embodiment can provide an effect of smoothing the movement of the pilot valve member 95, because the elastic deformation of the spring member 106a can continuously shift from the respective circumferentially extending spring portions 118 having low spring constants to the respective radially extending spring portions 117 having high spring constants (the deflection can be gradually limited) when the pilot valve member 95 is advanced, due to the employment of the inclined surface as the step surface 74a of the annular stepped portion 74 formed on the opposite end side cylindrical wall portion 71 of the pilot body 49. Further, the respective circumferentially extending spring portions 118 of the spring member 106a are elastically deformed along the step surface 74a as the inclined surface of the annular stepped portion 74 of the opposite end side cylindrical wall portion 71, whereby the deformation amounts of the respective circumferentially extending spring portions 118 can be reduced so that the durability can be enhanced.

Figure 8:
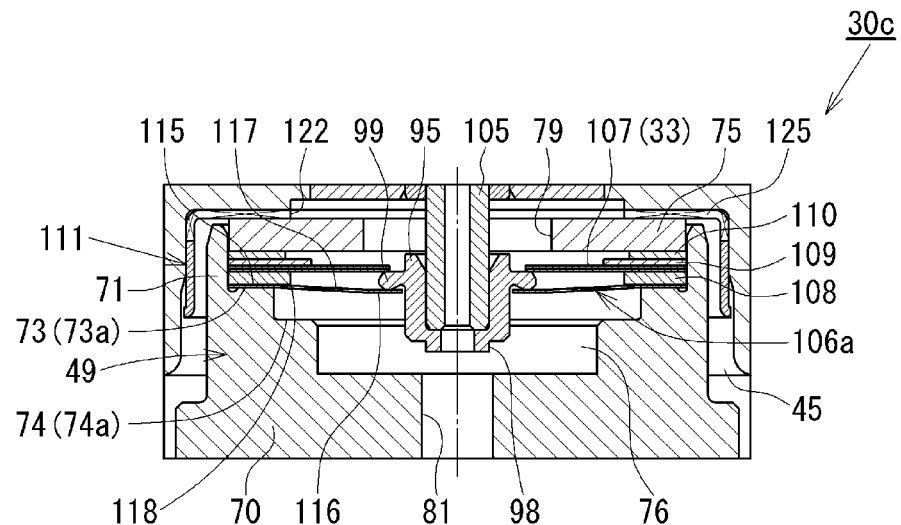
FIG. 8 is a cross-sectional view illustrating main parts of a damping force generation mechanism according to a third embodiment.

Next, a damping force generation mechanism 30c according to a third embodiment will be described with reference to FIG. 8. In the following description of the damping force generation mechanism 30c according to the third embodiment, only a difference from the damping force generation mechanism 30a according to the first embodiment will be described. In the damping force generation mechanism 30a according to the first embodiment, the pilot valve 36 is employed as the pressure control valve. On the other hand, in the damping force generation mechanism 30c according to the third embodiment, the pilot valve 36 is configured as a flow amount control valve. More specifically, the pilot valve 36 is configured in such a manner that the valve tip portion 98 of the pilot valve member 95 of the pilot valve 36 is formed into a cylindrical shape, and the pressure is balanced between this cylindrical portion and the opposite end side of the not-illustrated actuation rod 105. The present embodiment adjusts a flow passage area of a control port between the one end of the valve tip portion 98 and the opposite end of the small-diameter communication hole 81 of the pilot body 49 according to the current supplied to the coil 131. Then, the damping force generation mechanism 30c according to the third embodiment can also provide a similar effect to the damping force generation mechanism 30a according to the first embodiment.

Figure 9:
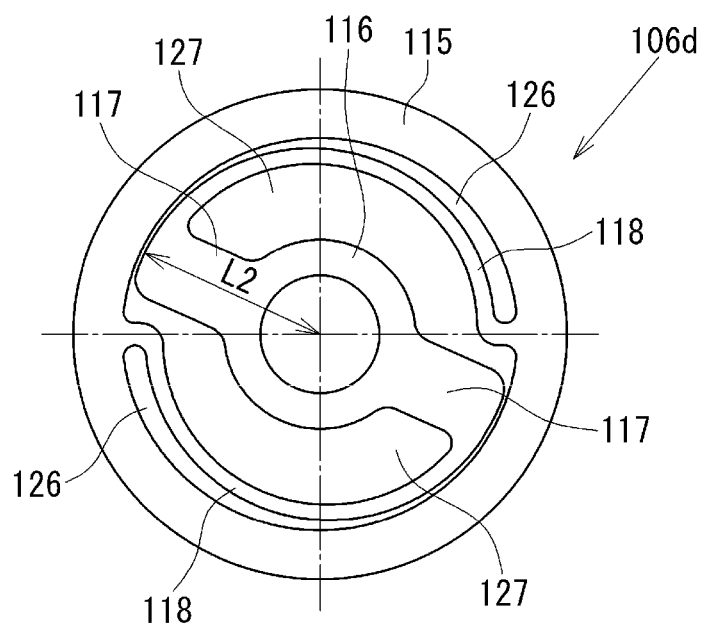
FIG. 9 is a plain view of a spring member employed in a damping force generation mechanism according to a fourth embodiment.

Next, a damping force generation mechanism 30d according to a fourth embodiment will be described with reference to FIG. 9. In the following description of the damping force generation mechanism 30d according to the fourth embodiment, only a difference from the damping force generation mechanism 30a according to the first embodiment will be described. In the damping force generation mechanism 30d according to the fourth embodiment, radii L2 of the respective radially extending spring portions 117 of a spring member 106d are set to be longer than the radii L1 (refer to FIG. 3) of the respective radially extending spring portions 117 of the spring member 106a employed in the damping force generation mechanism 30a according to the first embodiment. This setting can reduce deformation amounts of the respective radially extending spring portions 117 of the spring member 106d, thereby enhancing the durability. Further, the opening areas 127 are larger than the opening areas 127 of the respective radially extending spring portions 117 employed in the damping force generation mechanism 30a according to the first embodiment, whereby this spring member 106d can be less affected by a fluid force, thereby providing the stabilized performance.

Figure 10:
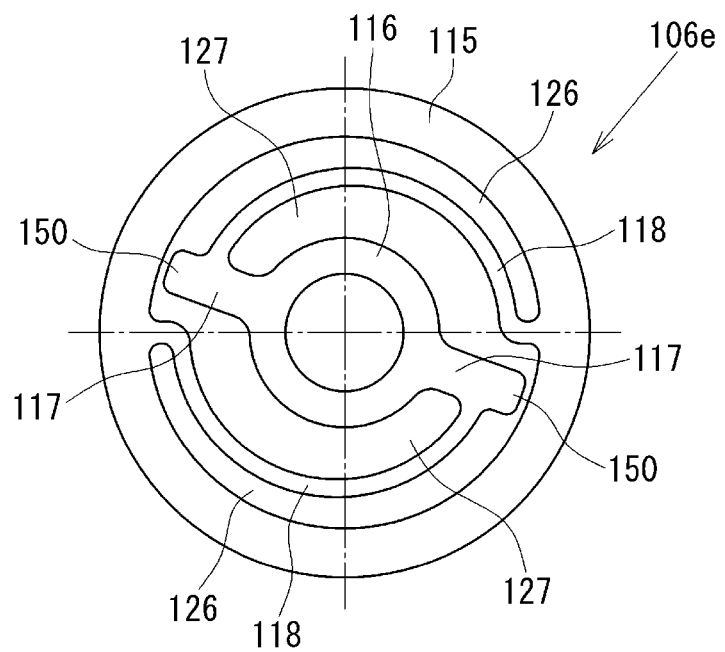
FIG. 10 is a plain view of a spring member employed in a damping force generation mechanism according to a fifth embodiment.

Next, a damping force generation mechanism 30e (a spring member 106e) according to a fifth embodiment will be described with reference to FIG. 10. In the following description of the damping force generation mechanism 30e according to the fifth embodiment, only a difference from the damping force generation mechanism 30a according to the first embodiment will be described. In the damping force generation mechanism 30e according to the fifth embodiment, the respective circumferentially extending spring portions 118 of the spring member 106e are connected to radially intermediate positions of the respective radially extending spring portions 117, and protruding portions 150 are formed so as to radially protrude from the connection portions between the respective radially extending spring portions 117 and the respective circumferentially extending spring portions 118. Then, in the spring member 106e according to the fifth embodiment, when a small thrust force is applied to the pilot valve member 95, during elastic deformations of the respective circumferentially extending spring portions 118 of the spring member 106e according to a movement of the pilot valve member 95, the respective circumferentially extending spring portions 118 do not abut against the step surface 74a of the annular stepped portion 74 formed on the opposite end side cylindrical wall portion 71 of the pilot body 49 but the protruding portions 150 (the abutment portion) of the respective radially extending spring portions 117 abut against the step surface 74a. Therefore, the present embodiment can reduce a stress applied to the connection portions between the respective circumferentially extending spring portions 118 and the respective radially extending spring portions 117, thereby enhancing the durability.

Figure 11:
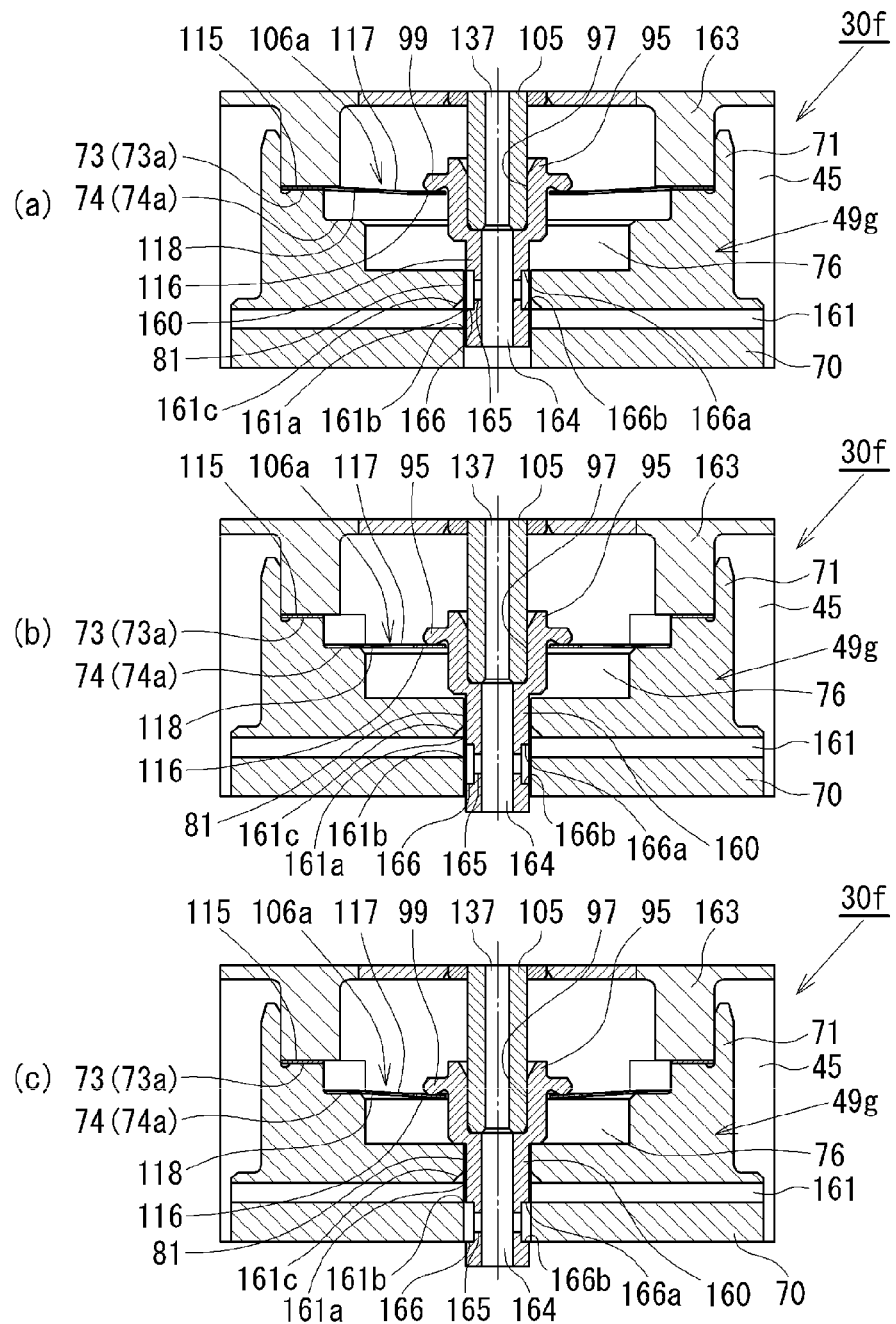
FIG. 11 are cross-sectional views illustrating an operation of a damping force generation mechanism according to a sixth embodiment when power is supplied to the coil.

Next, a damping force generation mechanism 30f according to a sixth embodiment will be described with reference to FIG. 11. In the following description of the damping force generation mechanism 30f according to the sixth embodiment, only a difference from the damping force generation mechanism 30a according to the first embodiment will be described. The damping force generation mechanism 30a according to the first embodiment employs a so-called poppet valve (a lift valve), in which the valve tip portion 98 of the pilot valve member 95 of the pilot valve 36 is separated from and seated on the seat portion 83 of the pilot body 49, thereby opening and closing the discharge passage. On the other hand, the damping force generation mechanism 30f according to the sixth embodiment employs a so-called spool valve in which a cylindrical portion 160 integrally protrudingly formed on the one end side of the pilot valve member 95 of the pilot valve 36 is inserted in the small-diameter communication hole 81 of a pilot body 49g, thereby opening and closing a flow passage 161 in communication with the small-diameter communication hole 81.

More specifically, the damping force generation mechanism 30f according to the sixth embodiment includes the flow passage 161 formed so as to radially extend at the bottom portion 70 of the pilot body 49g. The flow passage 161 is in communication with the small-diameter communication hole 81. The flow passage 161 is also in communication with the fluid chamber 45. Further, the small-diameter cylindrical portion 160 having an axially extending through-hole 164 is integrally formed on the one end side of the pilot valve member 95. The through-hole 164 is in communication with the container hole 97 of the pilot valve member 95, and has a smaller diameter than the container hole 97. As a result, the through-hole 164 is in communication with the communication passage 137 formed at the actuation rod 105. An outer diameter of the cylindrical portion 160 substantially matches an inner diameter of the small-diameter communication hole 81 of the pilot body 49g. Radially extending small-diameter and large-diameter openings 165 and 166 in communication with the through-hole 164 are formed near one end side of the cylindrical portion 160. The small-diameter opening 165 is located closer to the through-hole 164. Then, as illustrated in FIG. 11(a), the outer annular portion 115 of the spring member 160a is clamped at the step surface 73a of the annular stepped portion 73 of the opposite end side cylindrical wall portion 71 of the pilot body 49g by a clamping member 163, and the inner annular portion 116 of the spring member 160a is in abutment with the one side surface of the spring receiving portion 99 of the pilot valve member 95. Further, the valve chamber 76 is closed by the clamping member 163. In the sixth embodiment, the fail-safe disk is not arranged on the opposite end surface of the spring receiving portion 99 of the pilot valve member 95. Therefore, the sixth embodiment has a configuration capable of acquiring an optimum damping force characteristic when a failure occurs, which includes a cutout 161c partially formed at an upper side 161a (as viewed in FIG. 11) of an opening of the flow passage 161 that faces the large-diameter opening 166 to establish narrowed communication between the large-diameter opening 166 and the flow passage 161 via the cutout 161c even when the cylindrical portion 160 moves maximally upwardly, and therefore can generate a predetermined damping force even when a current is not supplied. Further, the cylindrical portion 160 of the inner pilot valve member 95 is inserted in the small-diameter communication hole 81 of the pilot body 49g, which establishes communication between the through-hole 164 of the cylindrical portion 160 and the flow passage 161 via the small-diameter opening 165 and the large-diameter opening 166. In the state illustrated in FIG. 11(a), a lower portion 166b of the large-diameter opening 166 is located at a position beyond the upper side 161a of the flow passage 161, and the through-hole 164 of the cylindrical portion 160 and the flow passage 161 are in communication with each other via a predetermined communication area due to the cutout 161c. The lower portion 166b of the large-diameter opening 166 forms a fail-safe valve body, and the upper end 161a of the flow passage 161 forms a fail-safe valve seat.

Then, when power is supplied to the coil 131, the pilot valve member 95 operates from the state illustrated in FIG. 11(a) to the state illustrated in FIG. 11(b). More specifically, the pilot valve member 95 is advanced to such a position that the connection portions between the respective circumferentially extending spring portions 118 and the respective radially extending spring portions 117 of the spring member 106a abut against the step surface 74a of the annular stepped portion 74 formed on the opposite end side cylindrical wall portion 71 of the pilot body 49. As a result, the communication area between the through-hole 164 of the cylindrical portion 160 and the flow passage 161 increases compared to the state illustrated in FIG. 11(a). In this state illustrated in FIG. 11(b), the oil in the through-hole 164 in the cylindrical portion 160 of the pilot valve member 95 is introduced into the fluid chamber 45 via the flow passage 161 from the small-diameter opening 165 and the large-diameter opening 166 of the cylindrical portion 160, and a small damping force is generated because of the increase in the communication area between the through-hole 164 of the cylindrical portion 160 and the flow passage 161. After that, an increase in the current supplied to the coil 131 causes an increase in the thrust force to the pilot valve member 95, whereby the pilot valve member 95 operates into the state illustrated in FIG. 11(c). More specifically, the pilot valve member 95 is advanced against the biasing forces of the respective radially extending spring portions 117 of the spring member 106a, and the communication is almost shut off between the through-hole 164 of the cylindrical portion 160 and the flow passage 161. An upper portion 166a of the large-diameter opening 166 forms a valve body, and a lower side 161b of the flow passage 161 forms a valve seat. The above-described spool valve has been described based on the example in which the flow passage 161 is connected to the reservoir, and the through-hole 164 is in communication with the pilot chamber 78. However, the present embodiment may have a passage configuration in which a flow passage in communication with the valve chamber 76 is formed at the actuation rod 105, the communication is shut off between the through-hole 164 and the pilot chamber 78, and the flow passage 161 is in communication with the pilot chamber 78.

Further, the above-described respective embodiments have been described based on the example in which they are applied to the double tube type shock absorber having the reservoir 4. However, the present invention is not limited thereto, and may be applied to generation of a damping force by a single tube type shock absorber in which a gas chamber is defined in a cylinder by a free piston, as long as the shock absorber has a similar damping force generation mechanism to the above-described embodiments. In this case, the damping force generation mechanism according to the present invention is provided at the piston portion. Further, the hydraulic fluid is not limited to the oil, and may be another fluid such as water. Alternatively, the present invention may use only gas such as air and nitrogen gas without using fluid. In this case, the reservoir 4, the base valve 10, the free piston, and the like may be omitted.

Further, the above-described embodiments have been described based on the example of the pilot control shock absorber in which the valve body is the pilot valve member 95 configured to control the pilot pressure, and the valve block 35 is constituted by the pilot body 49. However, the present invention is not limited thereto, and can be also applied to a shock absorber that controls a flow of the hydraulic fluid in the cylinder by directly opening and closing the valve body with use of the solenoid instead of the pilot pressure, thereby adjusting the damping force. Further, the above-described embodiments have been described based on the example in which the spring unit is configured to operate so as to bias the pilot valve member 95 in the direction for opening the discharge passage. However, the present invention is not limited thereto, and the spring unit may be configured to operate to bias the pilot valve member 95 in the direction for closing the discharge passage. That is, the spring unit can be provided in any manner as long as the spring unit can operate to bias the pilot valve member 95 in the direction in which the pilot valve member 95 moves. In this case, the present invention can be realized by using a type that causes the pilot valve member 95 to move in the direction for opening the discharge passage, i.e., a pull type as the solenoid actuator. Further, the above-described embodiments have been described based on the example in which the main valve is the disk valve equipped with the slidable seal member 57. However, the pilot portion may be sealed by a disk. Further, the present invention may use an undeflectable plate valve without using the disk valve, and the main valve may be any type of valve.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2013-073889, filed on Mar. 29, 2013. The entire disclosure of Japanese Patent Applications No. 2013-073889, filed on Mar. 29, 2013 including specification, claims, drawings and summary is incorporated herein by reference in its entirety.

What is claimed is:

1. A shock absorber comprising:
a cylinder sealingly containing hydraulic fluid;
a piston slidably and fittedly inserted in the cylinder;
a piston rod coupled to the piston, and extending out of the cylinder; and
a damping force generation mechanism configured to generate a damping force by controlling a flow of the hydraulic fluid generated by a sliding movement of the piston,
wherein the damping force generation mechanism includes a main valve configured to generate the damping force, a back pressure chamber configured to apply a back pressure in a direction for closing the main valve, an introduction passage configured to guide the back pressure into the back pressure chamber, a discharge passage configured to discharge the back pressure in the back pressure chamber, and a control valve disposed in the discharge passage,
wherein the control valve includes a valve body disposed in the discharge passage, a valve seat, an actuator configured to generate a force for moving the valve body toward the valve seat according to a current, and a spring unit configured to bias the valve body in a direction opposite from a direction in which the valve body is moved by the actuator,
wherein the spring unit includes one member configured to act on the valve body throughout a whole range of the movement of the valve body, and a limiting member configured to limit a deflection of a part of the spring member by abutting a predetermined portion of the spring member against the limiting member with a predetermined deflection of the spring member when the valve body is moved toward the valve seat, and
wherein the spring member has a spring constant acting on the valve body due to a deflection of another part of the spring member at which a deflection is not limited, after limitation of the deflection of the spring member by the limiting member, which is higher than that of the spring member before limiting the deflection of the spring member.

2. The shock absorber according to claim 1, wherein the spring member is made of an annular plate-like spring, and
wherein the limiting member includes an abutment portion disposed on a valve seat side and configured to abut against between an outer circumference and an inner circumference of the plate-like spring when the plate-like spring is deflected by a predetermined amount.

3. The shock absorber according to claim 2, wherein the spring member is disposed in such a manner that the valve body is attached to an inner circumferential side thereof, and an outer circumferential side thereof is held by the valve seat side.

4. The shock absorber according to claim 3, wherein a lower spring constant is set to the outer circumferential side of the spring member relative to a portion of the spring member configured to abut against the abutment portion than a spring constant of an inner side of the spring member.

5. The shock absorber according to claim 4, wherein the spring member includes an outer annular portion configured to be held by the valve seat side and an inner annular portion where the valve body is disposed, and
wherein a circumferentially extending spring portion and a radially extending spring portion are provided between the outer annular portion and the inner annular portion, the circumferentially extending spring portion having one end connected to the outer annular portion, and extending circumferentially, the radially extending spring portion having one end connected to the circumferentially extending spring portion and an opposite end connected to the inner annular portion, and extending radially.

6. The shock absorber according to claim 5, wherein the spring member includes a connecting portion connecting the circumferentially extending spring portion and a radially extending spring portion, the connecting portion abutting the limiting member to be limited by the limiting member.

7. The shock absorber according to claim 1, wherein the limiting member is configured to gradually limit the deflection before the plate-like spring is deflected by the predetermined amount.

8. The shock absorber according to claim 1, wherein the range of the movement of the spring member from a position where the deflection of the part of the spring member is limited by the limiting member to a position where the valve body is seated on the seat portion is a range used in damping force control.

9. The shock absorber according to claim 1, wherein the actuator is configured to generate a force for moving the valve body toward the valve seat, and the spring member biases the valve body in a direction in which the valve body is separated from the valve seat.

10. The shock absorber according to claim 1, wherein the damping force generation mechanism includes a fail-safe valve, the fail-safe valve being configured to be closed by the valve body being retracted with the biasing force of the spring member, when the actuator does not generate the force.

* * * * *